(12) United States Patent
Herlihy

(10) Patent No.: US 12,545,417 B2
(45) Date of Patent: Feb. 10, 2026

(54) ADAPTIVE CONTROLLER FOR UNMANNED AIRCRAFT

(71) Applicant: Performance Drone Works LLC, Huntsville, AL (US)

(72) Inventor: Philip Herlihy, Mahopac, NY (US)

(73) Assignee: Performance Drone Works LLC, Huntsville, AL (US)

( * ) Notice: Subject to any disclaimer, the term of this patent is extended or adjusted under 35 U.S.C. 154(b) by 80 days.

(21) Appl. No.: 18/677,644

(22) Filed: May 29, 2024

(65) Prior Publication Data

US 2024/0409228 A1 Dec. 12, 2024

Related U.S. Application Data

(60) Provisional application No. 63/506,580, filed on Jun. 6, 2023.

(51) Int. Cl.
*B64D 31/00* (2006.01)
*B64D 1/02* (2006.01)
(Continued)

(52) U.S. Cl.
CPC .............. *B64D 31/00* (2013.01); *B64D 1/02* (2013.01); *G06N 20/00* (2019.01); *B64U 10/14* (2023.01); *B64U 2101/60* (2023.01)

(58) Field of Classification Search
CPC .......... B64D 31/00; B64D 1/02; G06N 20/00; B64U 2101/60; B64U 10/14
See application file for complete search history.

(56) References Cited

U.S. PATENT DOCUMENTS 8,311,970 B2 * 11/2012 Mcaree ................. E02F 9/264
702/174
10,915,073 B2 2/2021 Badgwell et al.
(Continued)

FOREIGN PATENT DOCUMENTS

AU 2021101989 A4 6/2021
CN 107783421 A * 3/2018 ............. G05B 13/04
(Continued)

OTHER PUBLICATIONS

Machine Translation of Foreign Reference: JP 6585673 B2—Yun et al. (Year: 2017).*
(Continued)

*Primary Examiner* — Scott A Browne
*Assistant Examiner* — Rami Nabih Bedewi
(74) *Attorney, Agent, or Firm* — Pearl Cohen Zedek Latzer Baratz LLP

(57) ABSTRACT

Techniques for an unmanned ariel vehicle (UAV) having a closed-loop controller that is gain scheduled based on a trained machine learning model. The closed-loop controller could be a PID controller. Real-time data pertaining to the motor being controlled is input to the trained machine learning model. Examples of the real-time data includes, but is not limited to, motor current, motor voltage, and an estimate of motor thrust. The trained machine learning model may also input an error term of the closed-loop controller. Tuning constants for the closed-loop controller are derived based on the prediction from the machine learning model. Gain scheduling for the closed-loop controller may thus be performed "online" while the UAV continues on its mission. Controller gain scheduling may be performed to account for changes in a payload carried by the UAV.

20 Claims, 11 Drawing Sheets

(51) Int. Cl.
  *G06N 20/00* (2019.01)
  *B64U 10/14* (2023.01)
  *B64U 101/60* (2023.01)

(56) References Cited

U.S. PATENT DOCUMENTS

| | | | |
|---|---|---|---|
| 11,150,655 B2 | 10/2021 | Zhou et al. | |
| 11,847,531 B1* | 12/2023 | Ozturk | G06N 20/10 |
| 2012/0101638 A1* | 4/2012 | Lin | G05B 11/42 |
| | | | 700/282 |
| 2020/0094874 A1* | 3/2020 | Sights | B60W 50/00 |

FOREIGN PATENT DOCUMENTS

| | | | | |
|---|---|---|---|---|
| CN | 116167528 A | * | 5/2023 | G06Q 10/04 |
| EP | 3904971 A1 | | 3/2021 | |
| JP | 6585673 B2 | * | 10/2019 | B64C 13/18 |

OTHER PUBLICATIONS

Machine Translation—CN 116167528 A—Jian et al. (Year: 2023).*
Machine Translation—CN 107783421 A—Cao et al. (Year: 2018).*

* cited by examiner

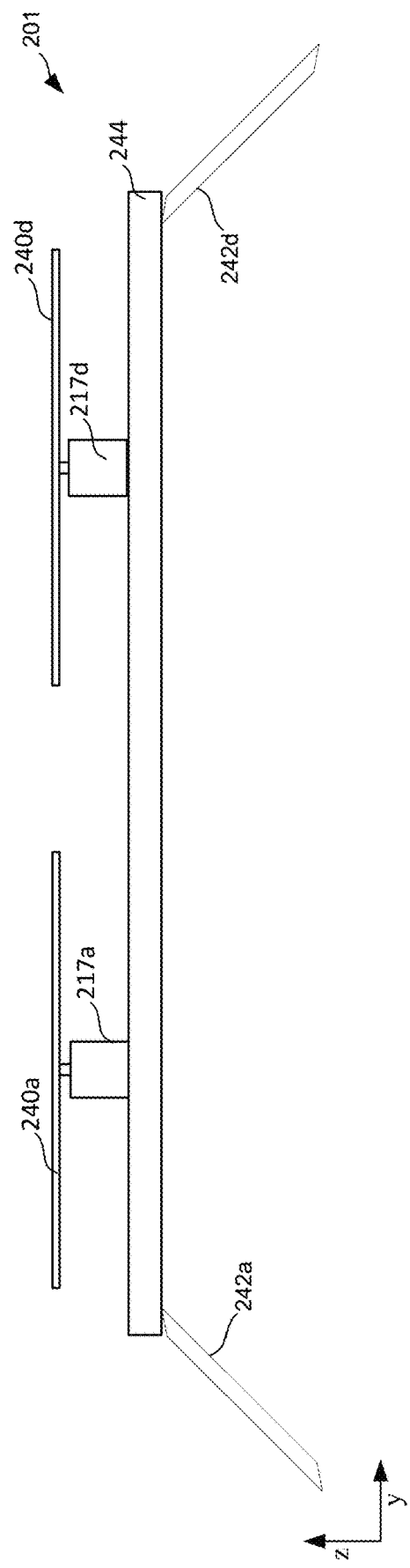

ADAPTIVE CONTROLLER FOR UNMANNED AIRCRAFT

CROSS-REFERENCE TO RELATED APPLICATION

The present application claims the benefit of U.S. Provisional Patent Application No. 63/506,580, filed on Jun. 6, 2023, which is hereby incorporated by reference in its entirety.

BACKGROUND

Radio controlled unmanned aerial vehicles (UAV) e.g., drones, such as quadcopters) can move at high speed and make rapid changes in direction when remotely piloted by a skilled user. A UAV may include a flight controller that provides output to motors and thus controls propeller speed to change thrust. For example, a quadcopter has four motors, each coupled to a corresponding propeller, with propellers mounted to generate thrust substantially in parallel (e.g., their axes of rotation may be substantially parallel). The flight controller may change speeds of the motors to change the orientation and velocity of the unmanned aircraft and the propellers may remain in a fixed orientation (i.e. without changing the angle of thrust with respect to the quadcopter) and may have fixed-pitch (i.e. propeller pitch may not be adjustable like a helicopter propeller so that each motor powers a corresponding fixed-pitch propeller in a fixed orientation with respect to a drone chassis). The flight controller may be directed by commands received from the user's remote-control and may generate outputs to motors to execute the commands.

The flight controller may contain or otherwise communicate with a closed-loop controller that uses feedback to control the motors. One type of closed-loop controller is a proportional-integral-derivative (PID) controller. PID controllers have been used to control UAVs. FIG. 1 depicts a conventional system having a PID for controlling a motor in a UAV. The UAV may contain several motors, each of which is used to control one of the propellers of the UAV. The desired value or setpoint is r(t). The measured process value y(t) is fed back to the input and compared (by error summer 18) to the setpoint r(t) to create an error term e(t). As one example, if the PID controller is being used to control velocity of the UAV, then r(t) may be the target velocity for the UAV and y(t) may be the actual velocity of the UAV. The error term is provided to each of the calculation units 10, 12, 14 that calculate control terms (P, I, D), which adjust a control variable u(t). The control variable u(t) is a summation of the outputs of the calculation units 10, 12, 14 (formed by output summer 16). The control variable u(t) may be used to control a motor 20 in the UAV. For example, the control variable u(t) could be input to a motor 20 that controls a propeller of the UAV.

The proportional term $P_{out}$ is proportional to the present value of the error term e(t), as indicated by Equation 1. The term $K_p$ may be referred to as the proportional gain.

$$P_{out} = K_p e(t) \quad (1)$$

The integral term $I_{out}$ integrates past values of the error term e(t) over time, as indicated by Equation 2. The term $K_i$ may be referred to as the integral gain.

$$I_{out} = K_i \int_0^t e(\tau) d\tau \quad (2)$$

The derivative term $D_{out}$ estimates a future trend of the error term e(t) based on its present rate of change, as indicated by Equation 3. The term $K_d$ may be referred to as the derivative gain.

$$D_{out} = K_d \frac{de(t)}{dt} \quad (3)$$

Each of the terms $K_p$, $K_i$, and $K_d$ may be referred to as a gain or as a tuning constant. Suitable default values for the tuning constants may be derived for each control application. Deriving suitable values for each tuning constant can be challenging. Deriving suitable values for the tuning constants is typically easier if the system can be taken offline. However, determining suitable values for the tuning constants during operation of the system is more challenging. One technique for tuning the PID controller requires a detailed model of the UAV. However, a detailed model of the UAV is not always available. Note that some UAVs may carry and drop payloads. Therefore, the physical characteristics of the UAV may change making it difficult to develop a model of the UAV.

In some cases, tuning constant values that work well under some operating conditions do not work well at other operating conditions. Gain scheduling may be used to address this issue by using different values for the tuning constants under different operating conditions. For example, a table driven approach may be used. The table may contain different tuning constants for each of a number of operating regions. As noted, some UAVs may carry and drop payloads, which make gain scheduling difficult.

Note that the example in FIG. 1 is somewhat simplified. In practice several closed-loop controllers may be layered to control a single motor. For example, there could be a closed-loop controller for position control, a closed-loop controller for velocity control, as well as other closed-loop controllers. Further note that although some closed-loop controllers will use all three control terms ($P_{out}$, $I_{out}$, $D_{out}$), in some cases only one or two of the control terms are used. For example, a closed-loop controller that only uses the proportional term $P_{out}$ may be referred to as a P controller. Other examples include a PI controller, a PD controller, and an I controller.

SUMMARY OF THE DRAWINGS

FIG. 3 shows an example of some components of a quadcopter.

DETAILED DESCRIPTION

The following presents a system and techniques for an unmanned ariel vehicle (UAV) having a closed-loop controller that is gain scheduled based on a trained machine learning model. The closed-loop controller may be used to control a motor of the UAV. The motor may be used to operate a propeller of the UAV. In an embodiment, gains (or tuning constants) for a PID controller in a UAV are derived using a trained machine learning model. In an embodiment one or more of a proportional term $P_{out}$, an integral term $I_{out}$, and/or a derivative term $D_{out}$ are derived based on a prediction from the trained machine learning model. The term "prediction" is used herein broadly to refer to the output of a trained machine learning model. In an embodiment, the trained machine learning model inputs real-time data pertaining to the motor being controlled. Examples of the real-time data includes, but is not limited to, the motor current, the motor voltage, and an estimate of the motor thrust. The trained machine learning model may also input an error term of the closed-loop controller. Tuning constants for the closed-loop controller are derived based on the prediction from the machine learning model. Gain scheduling for the closed-loop controller may thus be performed "online" while the UAV continues on its mission. Moreover, the gains of the closed-loop controller may be modified without a pre-determined detailed model of the UAV and it potential payloads. Furthermore, gains of the closed-loop controller may be modified to account for changing operating conditions. The UAV may be used to carry and drop a payload. The weight and weight distribution of the payload may be unknown when the tuning constants for the closed-loop controller are initially determined. An embodiment of the trained machine learning model is able to predict information from which suitable tuning constants may be derived without direct knowledge of the payload or its weight. In an embodiment the machine learning model predicts characteristics of weight of the payload based on inputs such as the real-time motor current, the real-time motor voltage, an estimate of the real-time motor thrust, a predetermined thrust to power curve, and/or the real-time PID error. The tuning constants may be derived based on the prediction of the characteristic of weight of the payload. In one embodiment the machine learning model predicts suitable tuning constants (gains) for the closed-loop controller based on the real-time data. Therefore, embodiments of gain scheduling for the closed-loop controller of a UAV based on an ML model adapt to payload changes.

Figure 1:
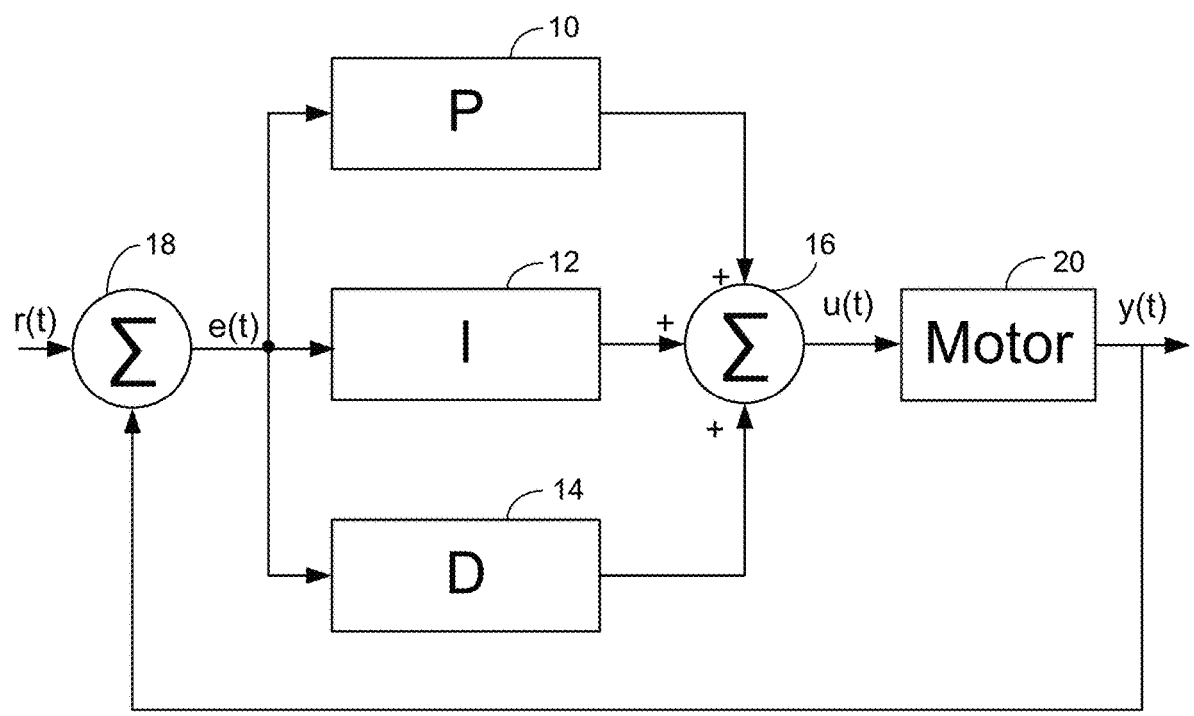
FIG. 1 is a block diagram of a conventional PID controller being used to control a motor.
Figure 2:
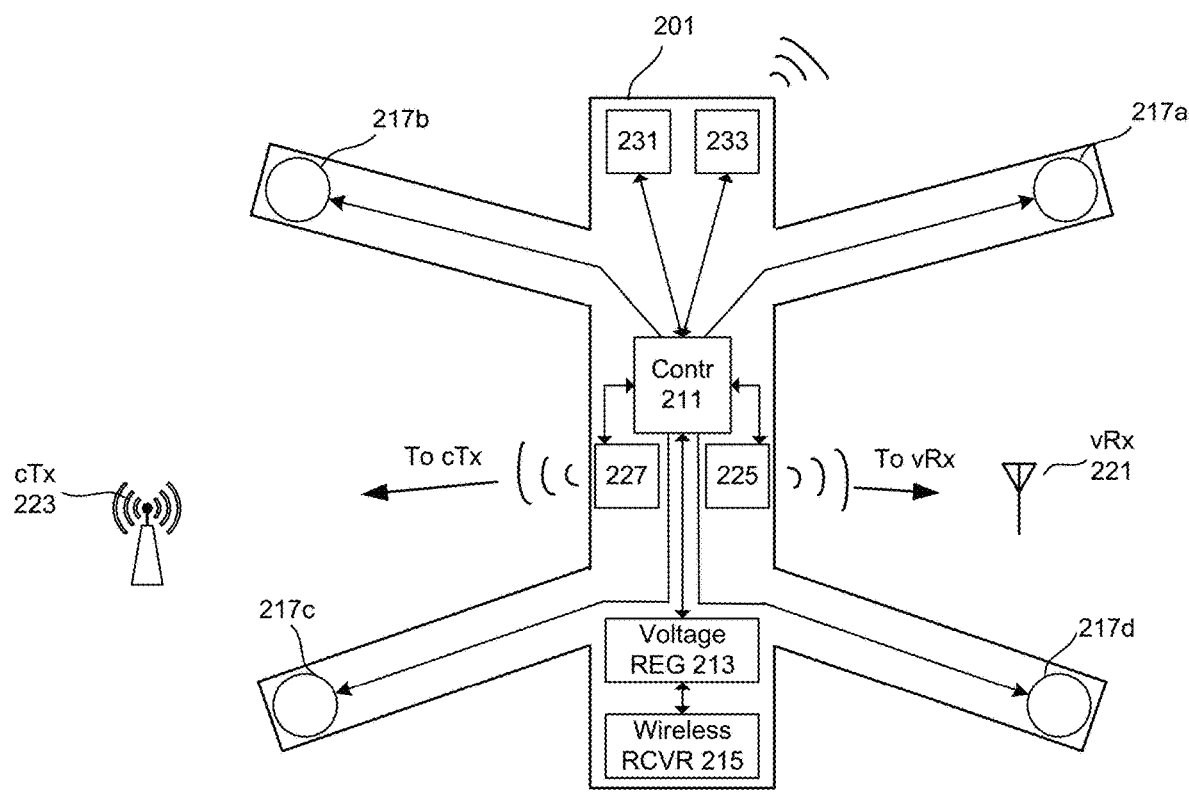
FIG. 2 is simplified representation of some of the components for one embodiment of an unmanned ariel vehicle (UAV).

FIGS. 2-8 show examples of UAVs that can be used with embodiments of gain scheduling based on an ML model. However, gain scheduling based on an ML model is not limited to the examples FIGS. 2-8. FIG. 2 is simplified representation of some of the components for one example of a UAV 201, which is a remote-controlled quadcopter in this example. FIG. 2 shows flight controller 211 connected to motors 217a-d (which turn respective propellers, not shown in this view), voltage source and regulator 213, wireless receiver 215, video camera 231, sensors 233, and transmitters 225 and 227. In this embodiment, extending on an arm from each of the corners of the drone is a motor 217a-d, each of which is controlled by the flight controller 211 to thereby control thrust generated by propellers attached to motors 217a-d. A voltage source (e.g., battery) and regulator 213 supplies power. A pilot's commands are transmitted from control signal transceivers such as cTx 223, received by wireless receiver 215. Control signal transceiver cTx 223 may be in a remote-control operated by a pilot (remote-control user) to fly UAV 201. The flight controller 211 uses power from the voltage source 213 to drive the motors 217a-d according to the pilot's signals.

The UAV 201 also includes sensors 233 that supply data to the flight controller 211. The sensors 233 may include an inertial measuring unit (IMU) that may track acceleration and angular velocity. The IMU may contain, for example, accelerometers, gyroscopes, etc. The sensors 233 may also include an altitude sensor, a magnetometer, and a rangefinder. IMU sensors may measure one or more of specific force, angular rate, and magnetic field using a combination of accelerometers (acceleration sensors), gyroscopes (gyroscopic sensors), and magnetometers to generate motion data (e.g., autonomous quadcopter motion data). For example, IMU sensors may be used as a gyroscope and accelerometer to obtain orientation and acceleration measurements. A rangefinder (which may be considered a distance or range sensor) measures the distance from UAV to an external feature (e.g., the ground, obstacle or gate along a racecourse, etc.). A rangefinder may use a laser to determine distance (e.g., pulsed laser, or Light Detection and Ranging "LiDAR"). Other possible sensors 233 include a barometer, or altimeter, to determine height of a drone above ground, and/or LIDAR sensors using lasers to generate 3-D representations of surroundings. In some cases, a Global Positioning System (GPS) module may be provided to provide position information based on communication with GPS satellites. Some of the sensors 233 may be connected to motors 217 to be able to collect real-time data from the motors. In an embodiment, the sensors 233 detect current input to a motor 217, as well as motor voltage.

An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will be part of a single transceiver module (e.g., a remote-control may include both a control signal transceiver and a video monitor receiver to allow a remote-control user to see video from video camera 231 while piloting drone 201).

The flight controller 211 contains one or more closed-loop controllers that control the motors 217. The closed-loop controllers may include PID controllers and P controllers, but are not limited thereto. Example closed-loop controllers for controlling motors 217 include, but are not limited to, a position controller, a velocity controller, an angle controller, and an angular rate controller. In an embodiment, a ML model is used to predict information based on real-time data of motor operation. The predicted information may be used to derive tuning constants (gains) for one or more of the closed-loop controllers. In an embodiment, gain scheduling is performed based on the prediction(s) of the ML model(s).

Using the ML model for gain scheduling helps to overcome challenges including, but not limited to, changing payloads attached to the UAV 201.

FIG. 3 shows a simplified side-view of UAV 201, which includes motors 217*a*, 217*d* (two of four motors 217*a-d* are visible in this view) and attached propellers 240*a*, 240*d*. Also shown are legs 242*a* and 242*d* (two of four legs are visible in this view) that are attached to the bottom surface of chassis 244 and support chassis 244 when on the ground. Electric motors 217*a-d* are mounted to the top surface of chassis 244 and drive corresponding propellers.

In some cases, a UAV such as a drone may be used to transport a payload. A payload may be attached to the UAV in various ways. According to an example, a UAV Mechanical Release Device (MRD) is provided that includes a quick-release UAV-attachment mechanism and a payload latch mechanism to secure and release a drop-payload. A latch actuator (e.g., a motor such as a servo motor) connected to the payload latch mechanism enables movement of the payload latch mechanism between closed and open positions to respectively hold and release the drop-payload. While examples described below refer to a closed position to capture a drop-payload and an open position to release a drop-payload, other positional states may additionally or alternatively be provided to allow capture and release (e.g., more than two discrete positions and/or a range of positions between open and closed positions).

Figure 4A:
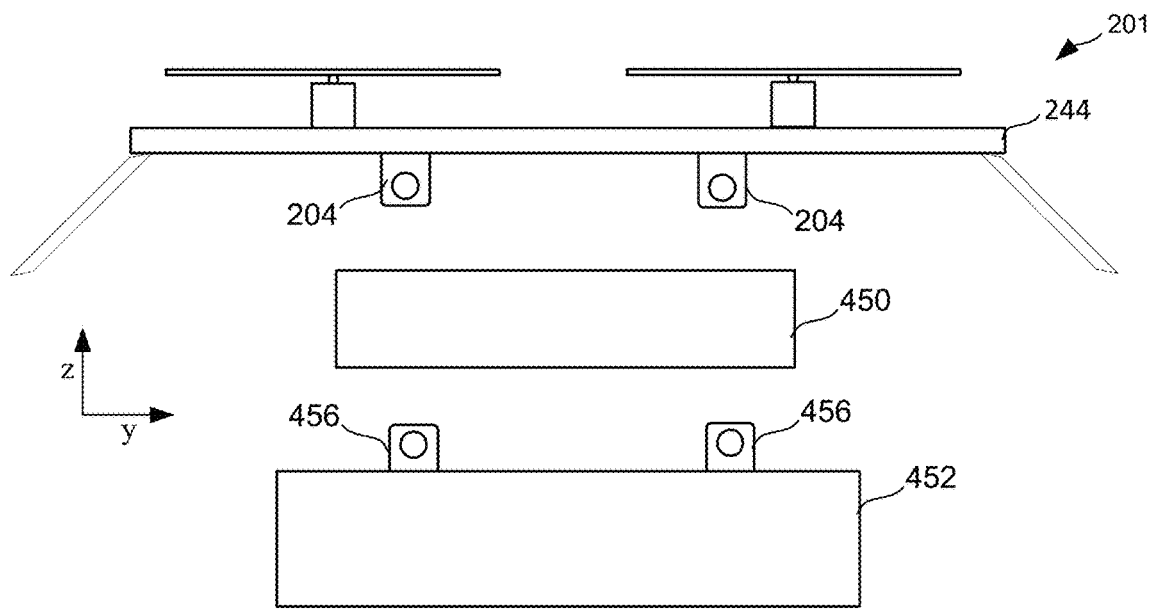
FIGS. 4A and 4B illustrate an example of a UAV with a Mechanical Release Device (MRD) and drop-payload.

FIG. 4A shows an example of an MRD 450, which is shown between UAV 201 and drop-payload 452 (unattached in this view). Lugs 204 extend from UAV 201. Lugs 204 may be attached (e.g., bolted, welded, riveted or otherwise attached) to UAV 201 (e.g., to a UAV chassis or other component). MRD 450 is configured for attachment to lugs 204 by one or more quick-release mechanisms. Drop-payload 452 includes lugs 456. MRD 450 is configured to hold lugs 456 and thereby hold drop-payload 452 and to release lugs 456 and thereby release drop-payload 452 in response to a command (e.g., from a remote control).

Figure 4B:
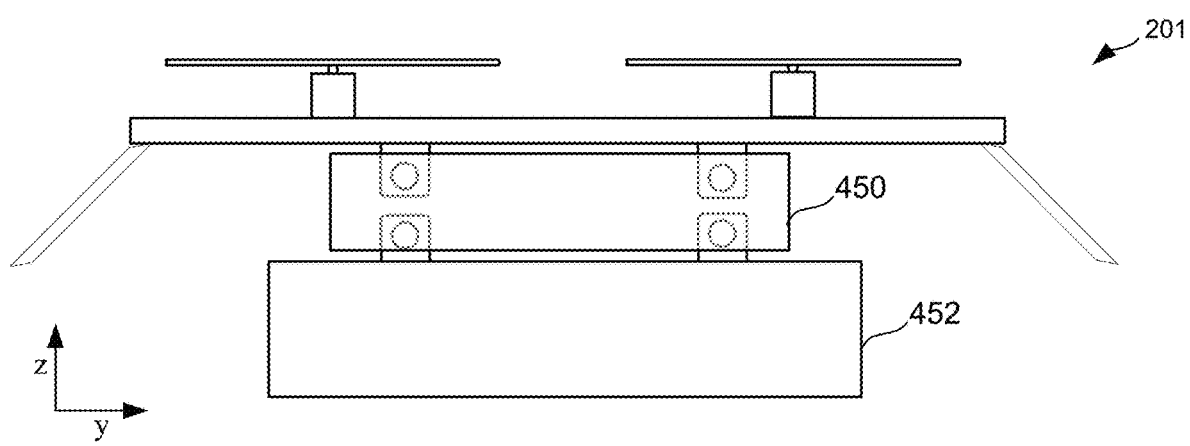

FIG. 4B illustrates MRD 450 attached to UAV 201 and holding drop-payload 452. In this configuration, UAV 201 can fly with drop-payload 452 securely attached. Then, in response to a command, MRD 450 can release drop-payload 452 at a desired location (e.g., while in the air or after landing). Subsequently, UAV 201 (with MRD 450 attached) can continue flying (or take off if it has landed) and continue to another location. In some examples, MRD 450 may pick up a drop-payload without manual intervention (e.g., a UAV may be lowered from a position above a drop-payload, the MRD may engage the drop-payload and then the UAV may take off with the drop-payload secured to the UAV by the MRD). To reconfigure UAV 201 for other operations that do not require remote controlled release of a drop-payload, MRD 450 can simply be detached (e.g., using quick-release attachment features).

Lugs 456 may be positioned for capture by corresponding engagement features of MRD 450. Drop-payload 452 may be a container that is designed to interface with MRD 450 so that lugs 456 are appropriately configured (e.g., shape and locations of lugs correspond to engagement features of the MRD).

In some cases, for example, to accommodate a wide range of drop-payloads, a drop-payload plate or frame may be provided that includes lugs at appropriate locations for capture by an MRD. Such a plate or frame may be compact, lightweight and have a range of attachment points suitable for attaching various drop-payloads without the need for customized containers.

Figure 5A:
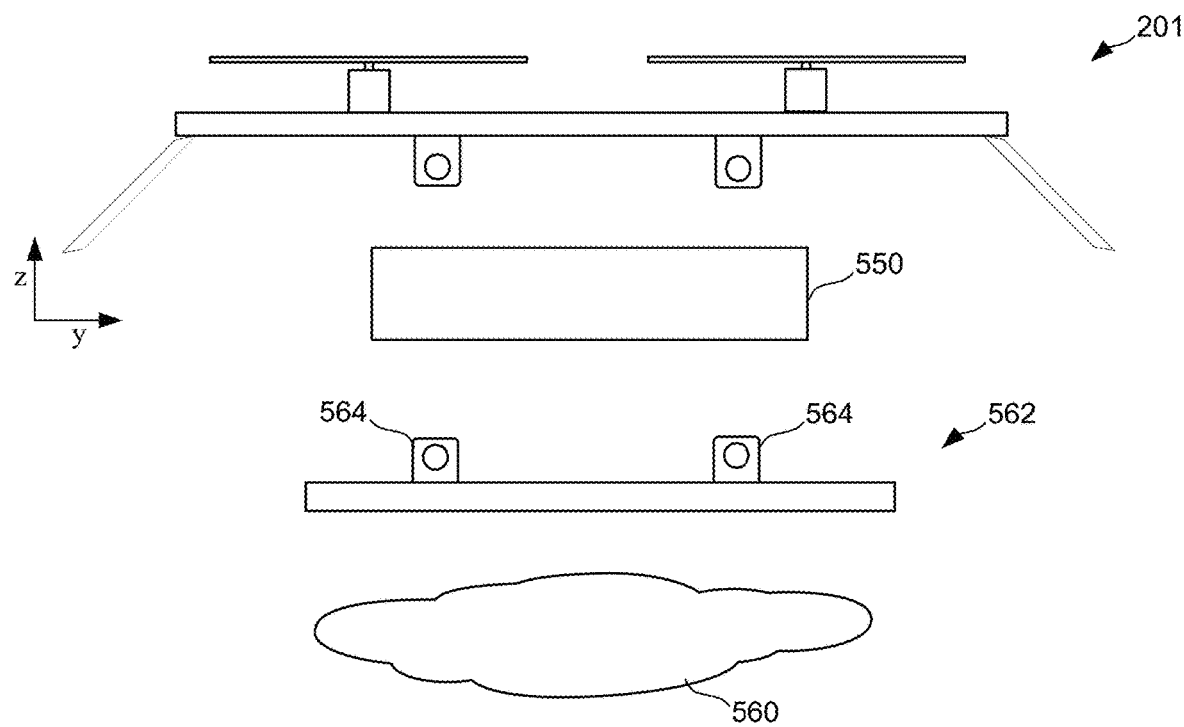
FIGS. 5A, 5B, and 5C illustrate an example of a UAV with an MRD and drop-payload that includes a drop-plate.

FIG. 5A shows an example of UAV 201, MRD 550, a payload 560 and a drop-plate 562 (all shown separately in an unattached configuration). Drop-plate 562 includes lugs 564, which are arranged at appropriate locations for capture and release by MRD 550. While two lugs 564 are shown in this view, any number of lugs may be provided (e.g., four) according to the configuration of MRD 550.

Figure 5B:
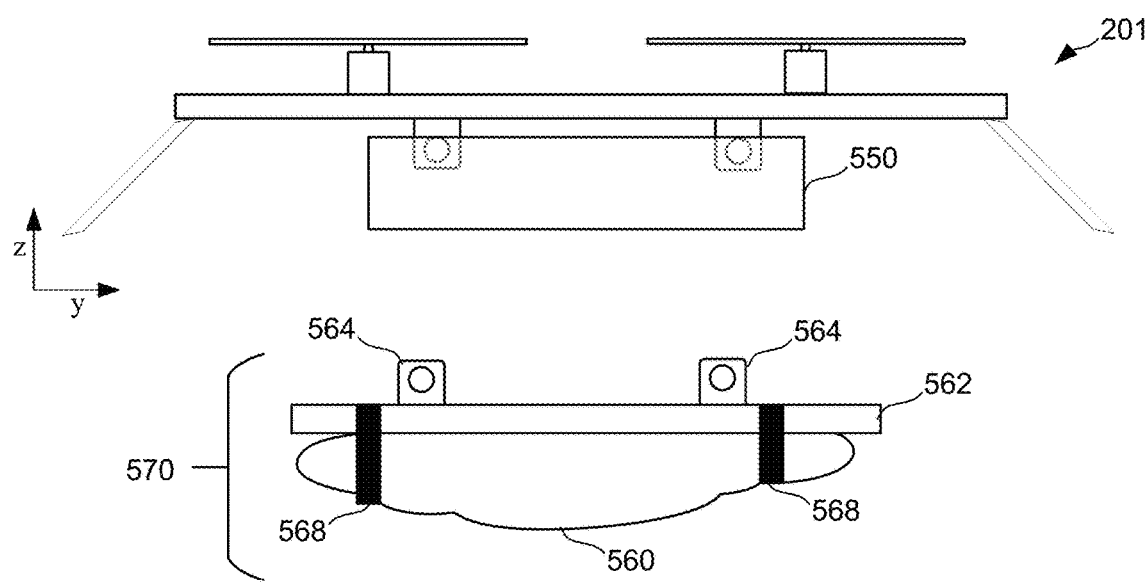

FIG. 5B shows an example of UAV 201, MRD 550, payload 560 and drop-plate 562 with MRD 550 attached to UAV 201 (e.g., by a quick-release mechanism). Payload 560 is attached to drop-plate 562 to form drop-payload 570 (the combination of payload 560 and drop-plate 562 is dropped as a single unit and may be considered a drop-payload). The attachment components used to attach a payload to a drop-plate may depend on the payload. For example, straps, netting, webbing, rope, bungee cord, or other material may be used and may be secured using buckles, hooks, carabineers, cable ties, knots, or otherwise. FIG. 5B shows payload 560 attached to drop-plate 562 by two straps 568, which may be secured with buckles (e.g., quick-release buckles). Drop-plate 562 may be in the form of a lightweight frame that includes a number of openings between frame members that allow straps, ropes or other attachment components to be looped through and/or attachment of hooks, carabineers or other hardware. Unlike a custom-designed container, such a drop-plate does not limit the physical dimensions of a payload and can accommodate a variety of irregularly sized/shaped payloads. A payload may be prepared by attachment to a drop-plate ahead of time (e.g., without the presence of a UAV) and may then be rapidly attached to a UAV equipped with an MRD. Attachment of a drop-payload (e.g., with a drop-plate) may be performed manually (e.g., lifting the drop-plate to place lugs in the correct locations) or without manual intervention (e.g., lowering a UAV equipped with a MRD down onto a drop-payload with lugs aligned with corresponding features of the MRD and then engaging the lugs with engagement features of the MRD).

Figure 5C:
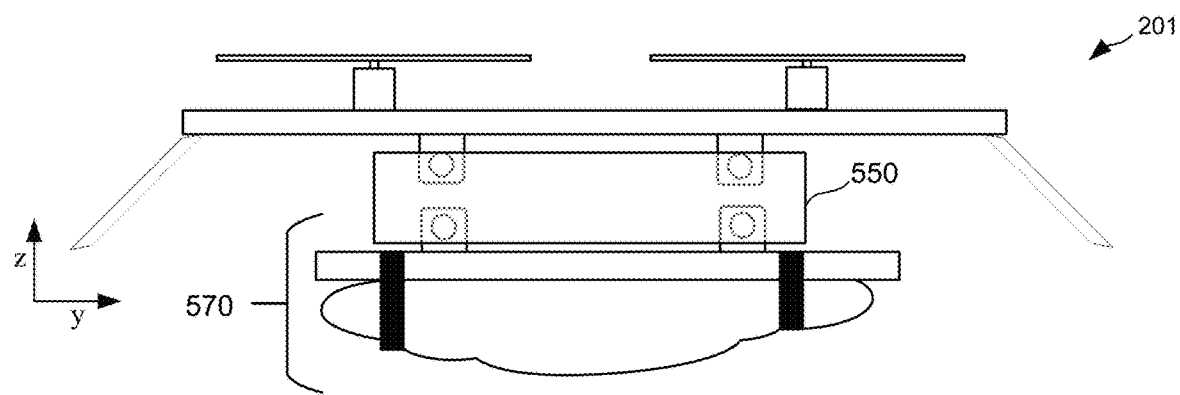

FIG. 5C shows an example of UAV 201 with MRD 550 holding drop-payload 570. UAV 201 may fly with drop-payload 570 securely held in this configuration. Drop-payload 570 may be released by MRD 550 at any time in response to a command. For example, drop-payload 570 may be released while UAV 201 is in the air or after it has landed. A command to release drop-payload 570 may be sent from a remote control (e.g., through communication circuits of UAV 201 or directly to MRD 550).

Figure 6:
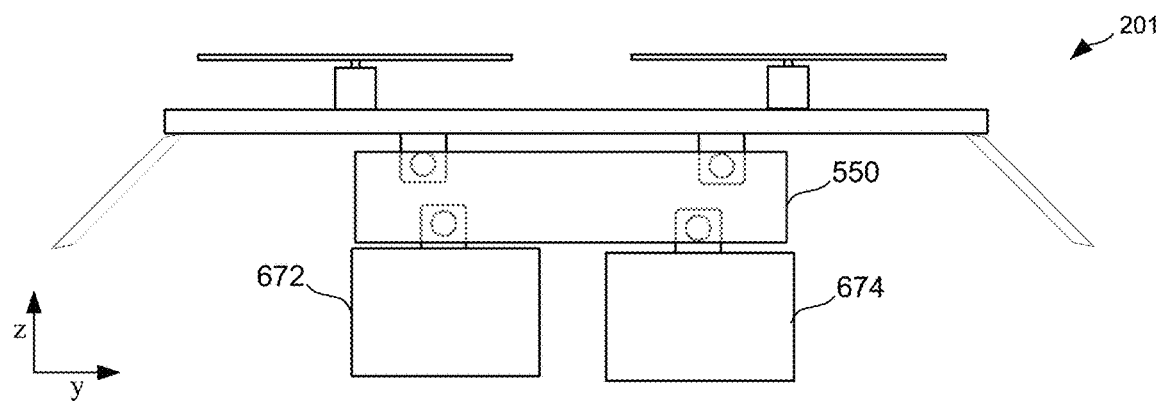
FIG. 6 illustrates an example of a UAV with an MRD and multiple drop-payloads.

While FIGS. 5A-5C show examples that include a UAV and MRD with a single drop-payload, more than one payload may be similarly carried by a UAV using an appropriate MRD. FIG. 6 shows an example of UAV 201 and MRD 550 with first drop-payload 672 and second drop-payload 674. In some cases, an MRD (e.g., MRD 550) may be adaptable to hold varying numbers of drop-payloads. For example, instead of holding one drop-payload that has four lugs, an MRD may hold two smaller drop-payloads that each have two lugs or four smaller drop-payloads that each have a single lug. In examples in which an MRD holds multiple drop-payloads, the payloads may be dropped together or separately depending on the configuration of the MRD and the command received (e.g., a command may specify which drop-payload(s) to drop).

Figure 7:
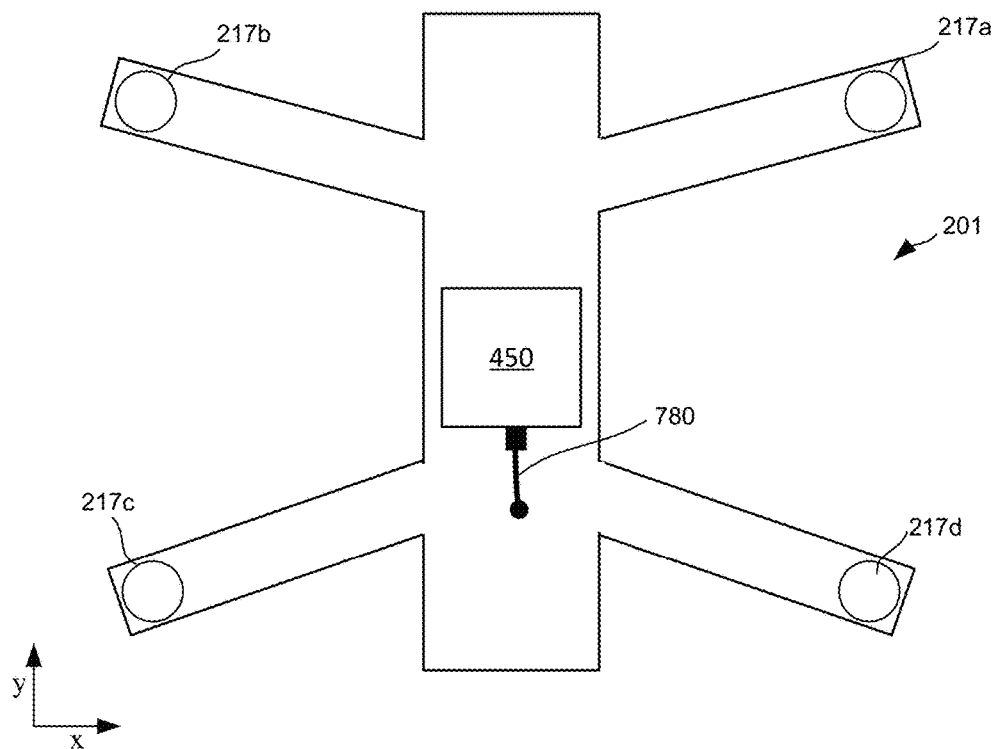
FIG. 7 illustrates an example of a UAV with an MRD.

FIG. 7 shows a view of UAV 201 (e.g., view from below along the z-direction) with MRD 550 attached to its underside. In addition to being mechanically attached to UAV 201 by quick-release attachment features (not shown in this view), MRD 550 is electrically connected to UAV 201 by a cable 780. Cable 780 may provide power from UAV 201

(e.g., from voltage source and regulator 213) to MRD 450. Cable 780 may also provide one or more communication channels for communication between UAV 201 and MRD 450. For example, commands or other communication may be sent from UAV 201 (e.g., from wireless receiver 215 or flight controller 211 to MRD 450). Such commands may be received by communication circuits of UAV 201 (e.g., wireless receiver 215) from a remote control and relayed to MRD 450 and/or may be generated by UAV 201.

Figure 8:
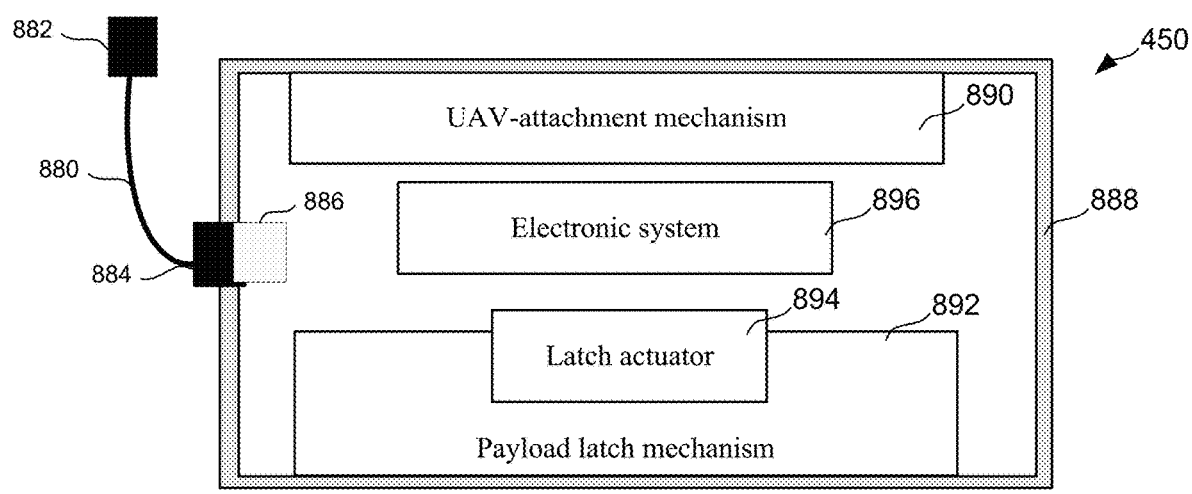
FIG. 8 shows a block diagram of an example of an MRD.

An MRD may be implemented in various ways. FIG. 8 shows a block diagram of certain components of an example implementation of MRD 450. Components are shown as blocks in FIG. 8 for illustration purposes. FIG. 8 is not intended to represent the shapes, locations, or other details of the components shown and is not intended to show all components of an MRD (an MRD may have more or fewer components than those illustrated).

MRD 450 includes cable 880 to connect MRD 450 to a UAV. Cable 880 includes connector 882 to connect to a corresponding connector on a UAV and connector 884 to connect to a corresponding connector 886 on an outer surface of MRD 450.

MRD 450 includes an enclosure 888, which extends about other components to provide protection structural support. Such an enclosure may be substantially sealed (e.g., waterproof) or partially open (e.g., a framework with multiple openings). Openings are provided in enclosure 888 for lugs of a UAV and for lugs of one or more drop-payload.

MRD 450 includes a UAV-attachment mechanism 890 to attach the UAV mechanical release device to a UAV. The UAV-attachment mechanism 890 may be a quick-release mechanism that allows MRD 450 to be rapidly attached and detached. For example, UAV-attachment mechanism 890 may include a plurality of pins (e.g., captured pins) to engage corresponding lugs of the UAV (lugs may have holes to accommodate pins). The captured pins may extend through enclosure 888. Other quick-release mechanisms may also be used.

MRD 450 includes one or more payload latch mechanism 892 to secure and release drop-payload(s). The payload latch mechanism(s) may include one or more engagement features to engage corresponding features of the drop-payload (e.g., to engage lugs of a drop-payload such as lugs 564). Engagement features may be movable by the latch mechanism between a closed configuration that holds the drop-payload(s) and an open configuration that releases the drop-payload(s).

MRD 450 includes a latch actuator 894 connected to the payload latch mechanism 892 to move payload latch mechanism 892 between the closed and open positions (e.g., to release the drop-payload or to allow insertion of a drop-payload lug when loading a drop-payload). Latch actuator 894 may be an electrical, pneumatic, hydraulic, or other actuator that provides mechanical force to move latch components. An example of a suitable latch actuator is an electric motor (e.g., servo motor, stepper motor, or other electric motor).

MRD 450 includes an electronic system 896, which may include various electronic components. Electronic system 896 may be connected to a UAV by cable 880, which may provide power and communication from the UAV to electronic system 896. Electronic system 896 may also be in communication with components of the UAV through cable 880. Electronic system 896 may include power circuits (e.g., one or more power controller) to receive an incoming power supply and generate suitable outputs for components of MRD 450 (e.g., converting a 24 volt power supply received from a UAV to other voltages used by MRD components). Electronic system 896 may also include control circuits to control components of MRD 450, including, for example, latch actuator 894, which in turn controls opening and closing of payload latch mechanism 892. Control circuits may include one or more processor and one or more memory. For example, a processor may operate using software stored in a memory and may be configured by such software. Electronic system 896 may include one or more sensors. For example, the one or more sensors may include one or more cameras, such as an infra-red or thermal camera and/or a visible (EO) camera (camera operating in the range of visible light, approximately 380-700 nm wavelength). The one or more sensors may include a rangefinder (e.g., laser rangefinder), which may be directed downwards to provide an accurate altitude measurement. Some or all sensor data (e.g., image and/or altitude data) may be sent to a UAV through cable 880 and may be sent from the UAV to a remote control or other remote device (e.g., so that a user can determine if the UAV is in the right location to drop the drop-payload). In some cases, image recognition or other logic in electronic system 896 or in a UAV may use data from sensors to identify a location (e.g., drop location) and may respond to identification of a location without an external command (e.g., dropping a drop-payload at a recognized location without a command from a remote control).

While the example of FIG. 8 uses components of the UAV for communication with a remote control, communication between components of MRD 450 and a remote control may be implemented in various ways using other control components that are not in the UAV. In an example, electronic system 896 of MRD 450 may include circuits for sending data directly to and receiving data (e.g., commands) directly from a remote control (e.g., a transmitter/receiver may be included in electronic system 896). Circuits enabling direct communication with a remote control may be in addition to components enabling communication with a UAV (e.g., cable 880) or may be instead of such components (e.g., MRD 450 may not have any communication with the UAV to which it is attached). Cable 880 may simply provide power (not communication) in this arrangement or MRD 450 may include a battery for power so that no cable connects MRD 450 to the UAV.

Figure 9:
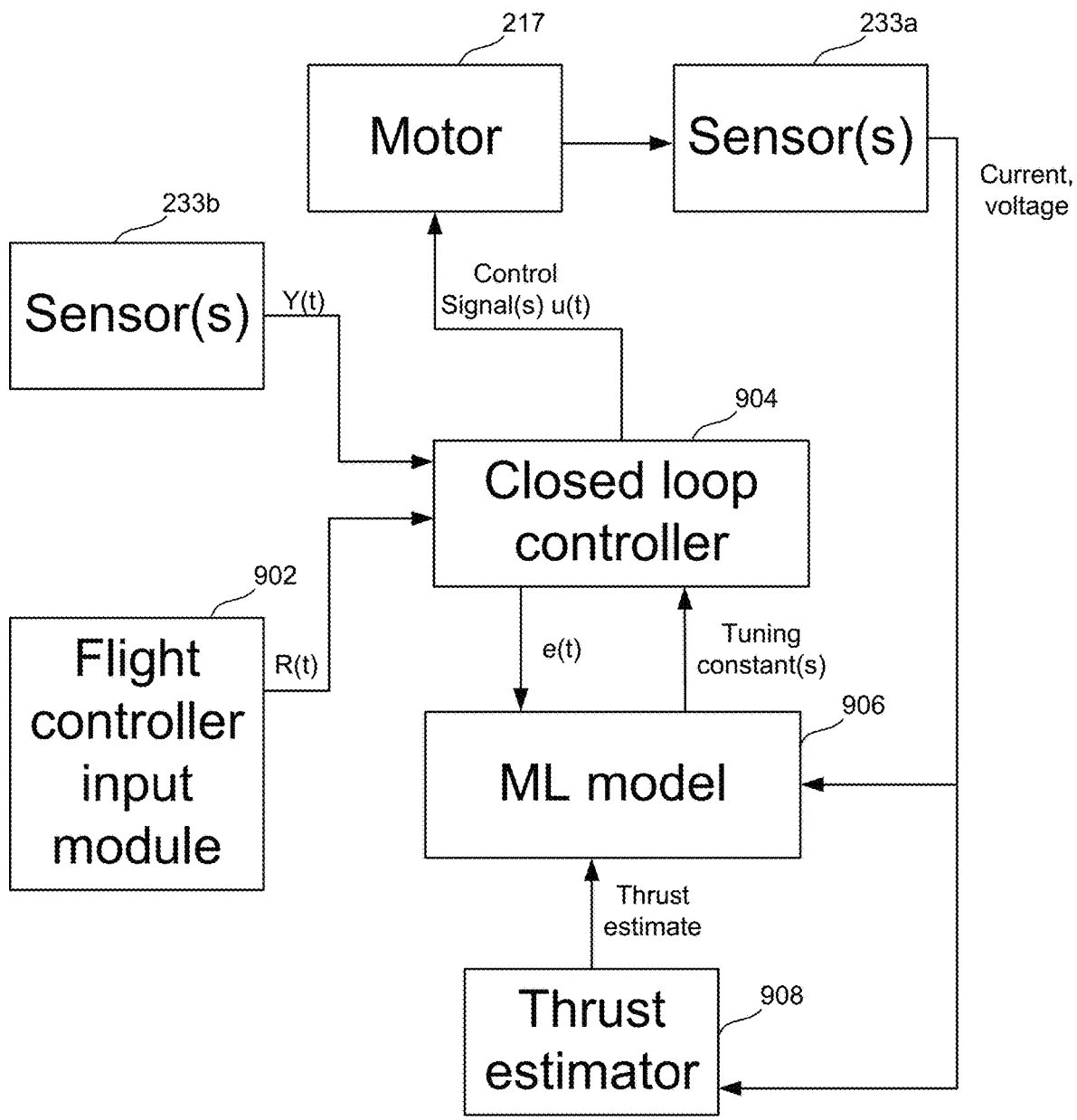
FIG. 9 depicts further details of one embodiment of a system for controlling the flight of a UAV.

FIG. 9 depicts further details of one embodiment of a system for controlling the flight of a UAV. The system uses an ML model to assist in gain scheduling of a closed-loop controller. The flight controller input module 902 may receive the pilot's commands and issue a target setpoint r(t) to the closed-loop controller 904. Examples of the target setpoint r(t) include, but are not limited to, a target position, a target velocity, a target rate of roll. A set of one or more sensors 233b provide a feedback signal y(t) to the closed-loop controller 904. For example, if the target setpoint is a target velocity then the feedback signal may be the actual velocity of the UAV.

The closed-loop controller 904 provides one or more control signals u(t) to the motor 217. The motor 217 could be, but is not limited to, any of the motors 217a, 217b, 217c, 217d (see FIG. 2). The closed-loop controller 904 determines an error signal e(t) based on a difference between the target setpoint r(t) and the feedback signal y(t). The error signal e(t) may be input to the machine learning (ML) model 906. The error signal e(t) is one example of real-time data of operation of the motor 217. Equation 4 may be used to determine the error signal.

$$e(t) = r(t) - y(t) \quad (4)$$

A set of one or more sensors 233a provides real-time data of operation of the motor 217. Examples of real-time data of operation of the motor 217 include, but are not limited to, current input to the motor 217 ("motor current") and motor voltage. In some embodiments, the present motor power is derived from the current and voltage readings. Thus real-time motor data is provided to the ML model 906. Real-time motor data may also be provided to the thrust estimator 908. The thrust estimator 908 estimates a real-time value for motor thrust. The thrust estimate may be input to the ML model 906. In an embodiment, the estimate of thrust is determined based on offline characterizing of the motor thrust and real-time measurements. Note that the UAV 201 might not have a sensor to directly measure the motor thrust in real time. However, in an embodiment, the real-time thrust is estimated based on sensor data and pre-determined modeling and/or benchmarking of the motor 217. In an embodiment the thrust estimate may be based on a pre-determined thrust curve for the motor 217, as well as real-time data of the motor (such as, but not limited to, motor current and/or voltage). The thrust curve may be learned from offline benchmarking. For example, the motor 217 may be stepped through its power range with the thrust measured for each power output. One technique for offline measuring of thrust is to use a sensor to measure the force that results from air movement due to the motor turning the propellor. Thus, the thrust curve may be for motor thrust versus motor power. In an embodiment, the motor power may be based on the motor current and the motor voltage. In an embodiment, the motor is a DC motor such that power is current times voltage. If an AC motor is used then a power factor may be used to determine power based on current and voltage. Those of ordinary skill in the art will understand calculation of the power factor. Thus, the motor thrust may be correlated to the motor power (as determined by, for example, motor current and motor voltage). In one embodiment, a thrust factor is determined based on the data set from offline measuring of thrust. The thrust factor may be a single unitless value (e.g., a floating point value). Thus, the thrust factor serves to characterize the motor 217 and may be used when estimating thrust in real-time. In an embodiment, a real-time measurement pertaining to thrust is also used to estimate the real-time thrust. The real-time measurement may be a measure of how much commanded thrust it takes to hover the UAV 201 at this time. This measure of how much commanded thrust it take to hover the UAV 201 at this time may be referred to as a "hover thrust estimate." The commanded thrust may be a command that is provided to the flight control input module 902. In an embodiment, the hover thrust estimate in effect is a measure of how hard the motor(s) are working to keep the UAV 201 in the air. The hover thrust estimate is, in one embodiment, a unitless value. As one example, adding a payload to the UAV 201 may increase the hover thrust estimate, which indicates that the motors 217 are working harder to keep the UAV 201 in the air.

The ML model 906 generates tuning constants (gains) for the closed-loop controller 904 based on one or more of its inputs. In an embodiment, the ML model 906 is trained offline based on a training data set that is generated based on operating the UAV 201 with a variety of different payloads. These different payloads may have different weights and possibly different weight distributions. Sensor data may be collected while the UAV is flown with the different payloads. The sensor data may include, but is not limited to, motor current, motor voltage. Also, the thrust estimate may be collected when the UAV is flown with the different payloads. In an embodiment, the ML model 906 is trained to predict characteristics of the UAV payload such as payload weight and/or payload weight distribution. The system may then derive suitable tuning constants (gains) based on the prediction of the weight characteristics of the UAV payload.

The closed-loop controller 904, ML model 906, thrust estimator 908, and flight controller input module 902 may be implemented in software, hardware, or a combination of software and hardware. One or more of the components 902, 904, 906, 908 may be implemented by a controller module, such as an NVIDIA Jetson AGX Xavier module, which includes a Central Processing Unit (CPU), Graphics Processing Unit (GPU), memory (e.g., volatile memory such as DRAM or SRAM), data storage (e.g., non-volatile data storage such as flash). Other suitable controller hardware may also be used.

Figure 10:
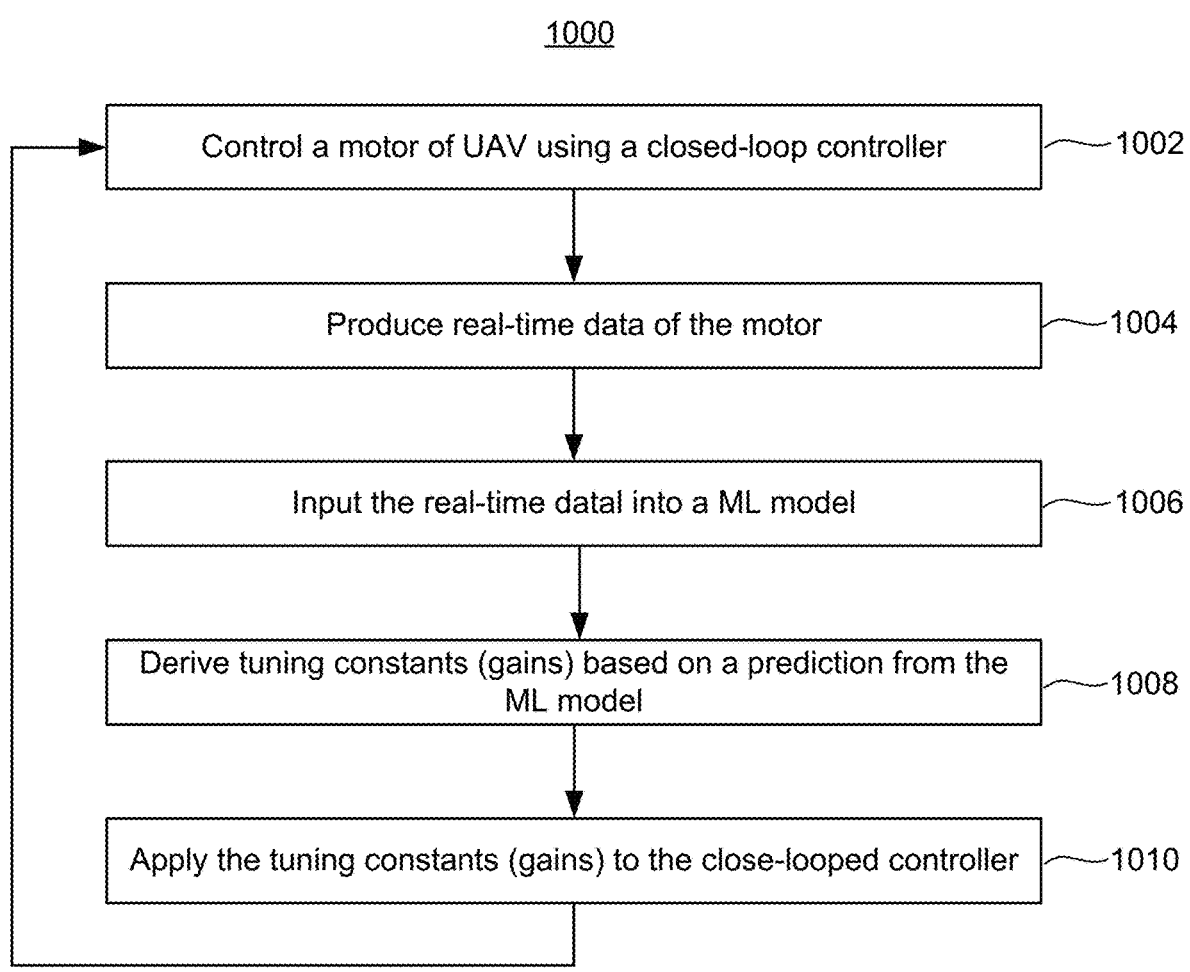
FIG. 10 is a flowchart of one embodiment of a process of controlling a motor in a UAV.

FIG. 10 is a flowchart of one embodiment of a process 1000 of gain scheduling for a closed-loop controller that controls a motor in a UAV. The gain scheduling may be based on a prediction from an ML model. The steps are described in a certain order as a matter of convenience of explanation. Some steps may occur simultaneously. Some steps could occur in a different order than depicted.

Figure 13:
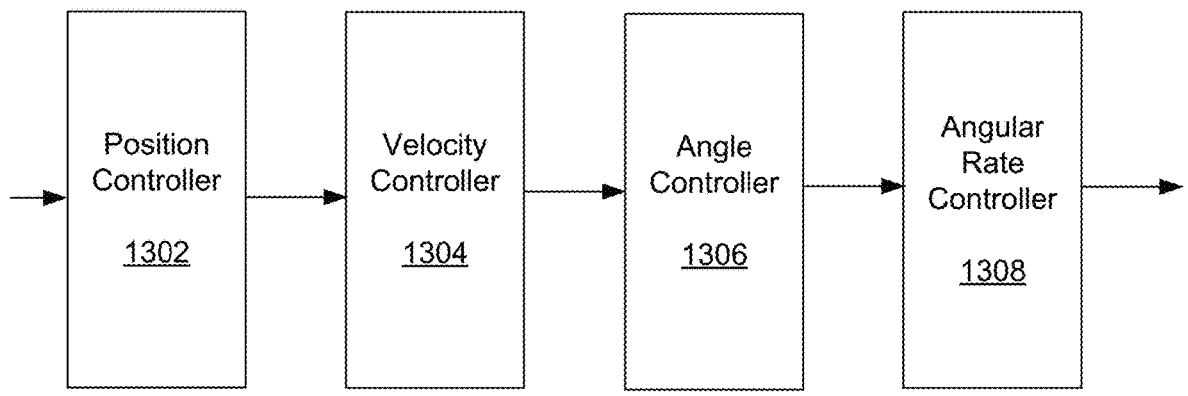
FIG. 13 is a simplified block diagram of a cascaded architecture of controllers.

Step 1002 includes controlling a motor of the UAV 201 using a closed-loop controller 904. In one embodiment the closed-loop controller 904 includes a PID controller. In one embodiment the closed-loop controller 904 includes a P controller. In one embodiment, the controller has a cascaded architecture. FIG. 13 has further details of an example of a cascaded architecture.

Steps 1004-1010 are one embodiment of gain scheduling based on an ML model 906. In an embodiment, the gain scheduling (e.g., steps 1004-1010) is performed in response to detecting a change to the payload attached to the UAV 201. Step 1004 in FIG. 10 includes producing real-time data of the motor 217. The real-time data is provided while the motor is being controlled by the closed-loop controller. In one embodiment, one or more sensors 233a are used to sense a current input of the motor 217. In one embodiment, one or more sensors 233a are used to sense a voltage of the motor 217. In one embodiment, a motor thrust is estimated by, for example, thrust estimator 908. The real-time data could also include the error signal e(t) from the closed-loop controller 904.

Step 1006 includes inputting the real-time data into a trained ML model 906. Step 1006 may also include inputting an error signal e(t) from the closed-loop controller 904 into the ML model 906. Step 1006 may also include the trained ML model 906 making one or more predictions based on its inputs. In one embodiment, the ML model 906 predicts weight characteristics of a payload presently attached to the UAV. The weight characteristics could include weight and/or weight distribution. In one embodiment, the ML model 906 predicts suitable tuning constants (gains) for the closed-loop controller 904.

Step 1008 includes deriving tuning constants (gains) from prediction(s) of the ML model 906. In one embodiment the system derives suitable tuning constants based on the predicted weight characteristics. In one embodiment the system uses tuning constants predicted by the ML model 906.

Step 1010 includes applying the tuning constants to the closed-loop controller 904. The process returns to step 1002.

Note that the step of controlling the motor may be performed continuously during process 1000.

Figure 11:
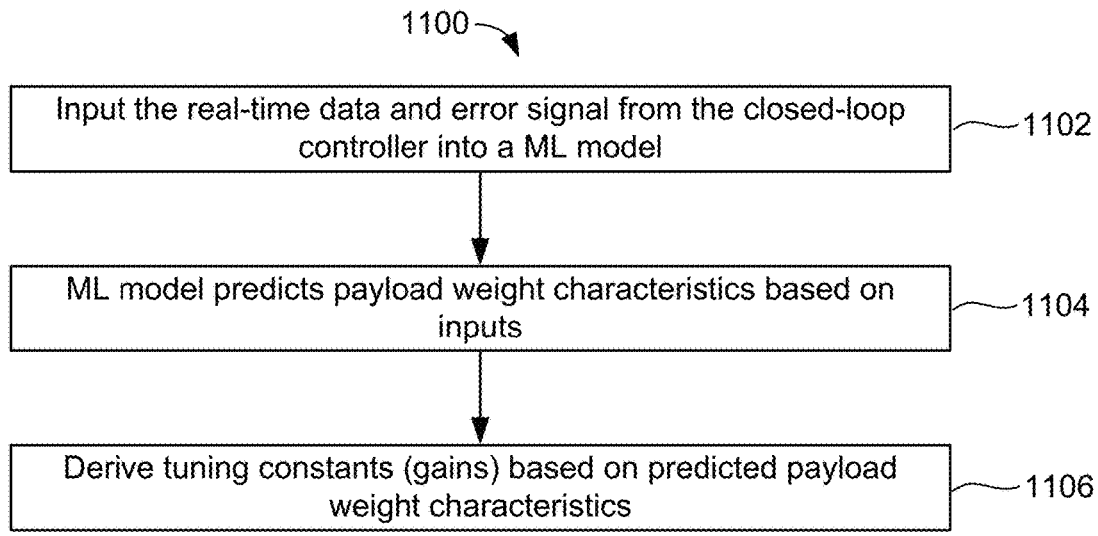
FIG. 11 is a flowchart of one embodiment of a process of determining tuning constants.

FIG. 11 is a flowchart of one embodiment of a process 1100 of deriving tuning constants for a closed-loop controller such as a PID controller. The process 1100 provides further details of how an ML model 906 may be used to derive tuning constants (gains) for a closed-loop controller 904 such as a PID controller. Step 1102 includes inputting real time data pertaining to the motor 217 (which may include, but is not limited to, sensor data 233 and an error signal e(t) from the closed-loop controller 904) to the ML model 906. Examples of the real time data include, but are not limited to, motor current, motor voltage, and estimated motor thrust. Other information such as density altitude may also be input to the ML model 906. The density altitude is the altitude relative to standard atmospheric conditions at which the air density would be equal to the indicated air density at the place of observation.

Step 1104 includes the ML model 906 predicting weight characteristics of the payload presently attached to the UAV 201 based on the inputs to the trained ML model 906. This prediction may include, for example, a prediction of the weight of the payload, and/or a prediction of the weight distribution of the payload. In an embodiment, the ML model 906 was previously trained based on a training data set that is generated based on operating the UAV with a variety of different payloads.

Step 1106 includes deriving tuning constants (gains) for the closed-loop controller 904 based on the prediction from the ML model 906. In an embodiment, the predicted weight characteristics of the payload is used to determine changes to the tuning constants. The predicted payload weight from the ML model 906 may be used as an input into an interpolation function between previously derived PID gains set while testing the vehicle with different payload weights.

The process 1100 of FIG. 11 is one embodiment of deriving tuning constants from the prediction from the ML model 906. However, other techniques could be used to derive the tuning constants from the prediction from the ML model 906. Rather than the ML model 906 predicting a weight, the ML model 906 might predict an operating region of the motor(s) 217. Then, the gain scheduling may be performed based on the operating region. For example, tuning constants (gains) may be derived given the present operating region. In one embodiment, the ML model 906 is trained to directly predict the tuning constants (gains).

Figure 12:
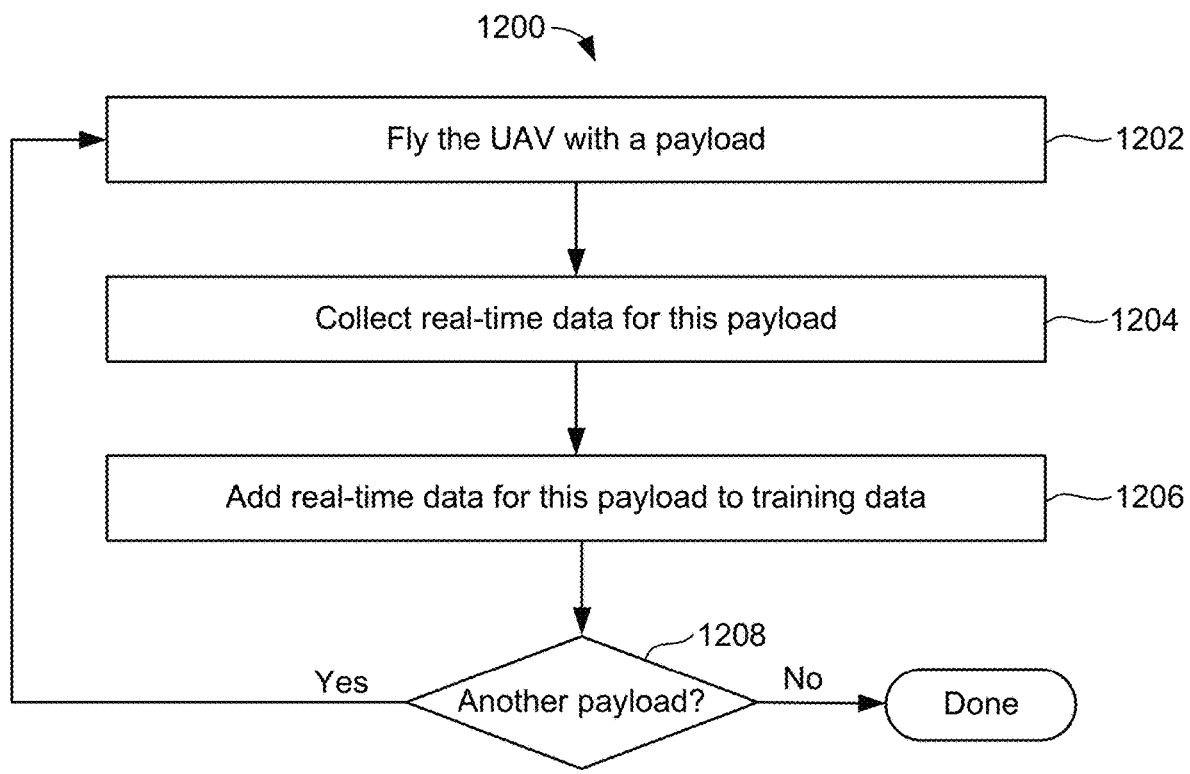
FIG. 12 is a flowchart of one embodiment of a process of collecting training data for training an embodiment of the ML model.

FIG. 12 is a flowchart of one embodiment of a process 1200 of collecting training data for training an embodiment of the ML model 906. Step 1202 includes flying the UAV 201 with a payload attached thereto. The payload will have certain weight characteristics such as total weight and/or weight distribution. In one embodiment, the gains that are applied to the closed-loop controller 904 in process 1200 have previously been tuned for the particular payload. The tuning of the gains may be performed at a different time than the data collection process. Determining suitable tuning constants may be accomplished by studying factors such as the error signal e(t) and adjusting the tuning constants to improve the performance of the closed-loop controller. However, in some embodiments, process 1200 is performed without having previously tuned the gains for each payload that is tested.

Step 1204 includes collecting real-time data while flying the UAV with this payload. The real-time data may include sensor data that is similar or the same sensor data that is input to the ML model 906 in step 1006 in process 1000 of FIG. 10. Step 1204 may include collecting other real-time data such as closed-loop controller error and a motor thrust estimate. This real-time data in step 1204 may be time-stamped such that the sensor data may be linked to the error.

Step 1206 includes adding the collected real-time data to training data. The system makes note of the weight characteristics of the payload for this set of training data.

Step 1208 includes a determination of whether training data is to be collected for another payload. If so, then the UAV 201 is flown with another payload. The next payload has different weight characteristics that any previously tested payload. In an embodiment, the process 1200 will test payloads having a range of weights that may be encountered in real use. Also, one of the loops of process 1200 could test the UAV without any payload.

In an embodiment, the ML model 906 is trained based on the training data collected in process 1200. In an embodiment, the training data is labeled. For example, the training may be what is commonly referred to as "supervised training." In an embodiment, the ML model 906 is trained to predict the weight of the payload. In an embodiment, the tuning constants (gains) for the closed-loop controller 904 are determined based on the prediction of the weight of the payload. In an embodiment, the ML model 906 is trained to directly predict suitable tuning constants (gains) for the closed-loop controller 904. Thus, the ML model 906 may be used to perform gain scheduling in response to changes in the payload of the UAV.

In some embodiment, the motor 217 is controlled with a cascaded architecture of multiple controllers. FIG. 13 is a simplified block diagram of a cascaded architecture. In an embodiment, gain scheduling is performed for at least one of the controllers in a cascaded architecture. The example cascaded architecture has a position controller 1302, a velocity controller 1304, an angle controller 1306, and an angular rate controller 1308. The angular rate controller 1308 may be used to control an angular rate of change of, for example, roll of the UAV. In one example, the output of one controller is input to the next controller as depicted in FIG. 13. The feedback signals are not depicted in FIG. 13. In one embodiment, the position controller 1302 is a P controller, the velocity controller 1304 is a PID controller, the angle controller 1306 is a P controller, and the angular rate controller 1308 is a PID controller. The cascaded architecture may be operated in different modes, which may include using all of the controllers or only a subset of the controllers.

Note that some of the controllers in the cascaded architecture may be more affected than others when a payload is attached to the UAV. In an embodiment, the PID controllers are more effected by a payload and therefore gain scheduling as disclosed herein is performed for the PID controllers. In one embodiment, gain scheduling using the ML model is performed at least for the angular rate controller 1308. In one embodiment, gain scheduling using the ML model is performed at least for the velocity controller 1304. controllers. In one embodiment, gain scheduling using the ML model is performed the velocity controller 1304 and the angular rate controller 1308. Optionally, gain scheduling using a ML model may be performed for the P controllers (e.g., position controller 1302, angle controller 1306).

In view of the foregoing, one embodiment includes an unmanned ariel vehicle (UAV) comprising one or more propeller and one or more motor. Each motor is coupled to and configured to control one of the propellers. The UAV includes one or more control circuits configured to control the one or more motors to control flight of the UAV. The one or more control circuits comprising a closed-loop controller. The one or more control circuits further configured to input real-time data pertaining to the one or more motors into a trained machine learning model outputs a prediction based on the real-time data. The one or more control circuits to derive one or more tuning constants based on the prediction from the machine learning model. The one or more control circuits are configured to apply the one or more tuning constants to the closed-loop controller.

In a further embodiment, the UAV comprises one or more sensors in communication with the one or more motors. The one or more sensors are configured to sense at least a portion of the real-time data. The machine learning model makes the prediction based at least in part on the real-time data from the one or more sensors.

In a further embodiment, the one or more sensors are configured to sense motor current and motor voltage. And the machine learning model makes the prediction based on the motor current and the motor voltage.

In a further embodiment, the one or more control circuits are further configured to input an error signal from the closed-loop controller into the trained machine learning model. The machine learning model makes the prediction based on the error signal.

In a further embodiment, the one or more control circuits are further configured to estimate a real-time thrust of the one or more motors. The real-time data input to the machine learning model includes the estimate of the real-time thrust. And the machine learning model makes the prediction based on the estimate of the real-time thrust.

In a further embodiment, the closed-loop controller comprises a proportional-integral-derivative (PID) controller. The one or more tuning constants include a proportional term $P_{out}$, an integral term $I_{out}$, and a derivative term $D_{out}$.

In a further embodiment, the UAV is configured to carry and drop a payload. The one or more control circuits are configured to modify the one or more tuning constants of the closed-loop controller in response to a change in the payload.

In a further embodiment, the closed-loop controller has default tuning constants that are tuned for the UAV not carrying a payload. The one or more control circuits are configured to: apply the default tuning constants to the closed-loop controller when the UAV is not carrying a payload; modify the tuning constants of the closed-loop controller based on the predictions from the machine learning model in response to adding a payload to the UAV; and re-apply the default tuning constants to the closed-loop controller in response to dropping the payload from the UAV.

In a further embodiment, the machine learning model predicts a weight of a payload of the UAV based on the real-time data. The one or more control circuits are configured to derive the one or more tuning constants based on the predicted weight.

In a further embodiment, the machine learning model directly predicts the one or more tuning constants based on the real-time data.

An embodiment includes a method for controlling an unmanned ariel vehicle (UAV). The method comprises: controlling a motor of the UAV using a closed-loop controller; producing real-time data of operation of the motor while the motor is controlled by the closed-loop controller; inputting the real-time data from the closed-loop controller into a machine learning (ML) model; making a prediction by the ML model based on the real-time data; deriving tuning constants based on the prediction by the ML model; and applying the tuning constants to the closed-loop controller while continuing to control the motor using the closed-loop controller.

An embodiment includes a system comprising an Unmanned Aerial Vehicle (UAV) and a UAV Mechanical Release Device (MRD) attached to the UAV. The MRD is configured to secure and release a payload from the MRD. The UAV comprises a propellor, a motor coupled to the propellor, and a processor. The motor is configured to control the propellor. The processor is configured to control the motor using a closed-loop controller, input real-time data pertaining to the motor into a trained machine learning model. Based on the real-time data the trained machine learning model predicts weight characteristics of a payload secured to the MRD. The processor is configured to determine one or more tuning constants based on the predicted weight characteristics of the payload. The processor is configured to apply the one or more tuning constants to the closed-loop controller.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An unmanned ariel vehicle (UAV) comprising:
   one or more propellers;
   one or more motors, each motor coupled to and configured to control one of the one or more propellers; and
   one or more control circuits configured to control the one or more motors to control flight of the UAV, the one or more control circuits comprising a closed-loop controller, the closed-loop controller has one or more default tuning constants that are tuned for the UAV not carrying a payload, the one or more control circuits further configured to:
apply the one or more default tuning constants to the closed-loop controller when the UAV is not carrying a payload;
input real-time data pertaining to the one or more motors into a trained machine learning model that outputs a prediction based on the real-time data while the UAV is carrying a particular payload;
modify the one or more default tuning constants based on the prediction from the trained machine learning model in response to adding the particular payload to the UAV; and
apply the modified one or more default tuning constants to the closed-loop controller while the UAV is carrying the particular payload.

2. The UAV of claim 1, further comprising one or more sensors in communication with the one or more motors, the one or more sensors configured to sense at least a portion of the real-time data, wherein the trained machine learning model makes the prediction based at least in part on the real-time data from the one or more sensors.

3. The UAV of claim 2, wherein:
the one or more sensors are configured to sense motor current and motor voltage; and
the trained machine learning model makes the prediction based on the motor current and the motor voltage.

4. The UAV of claim 1, wherein the one or more control circuits are further configured to:
input an error signal from the closed-loop controller into the trained machine learning model, the trained machine learning model makes the prediction based on the error signal.

5. The UAV of claim 1, wherein:
the one or more control circuits are further configured to estimate a real-time thrust of the one or more motors;
the real-time data input to the trained machine learning model includes the estimate of the real-time thrust; and
the trained machine learning model makes the prediction based on the estimate of the real-time thrust.

6. The UAV of claim 1, wherein:
the closed-loop controller comprises a proportional-integral-derivative (PID) controller; and
the one or more default tuning constants include a proportional term $P_{out}$, an integral term $I_{out}$, and a derivative term $D_{out}$.

7. The UAV of claim 1, wherein:
the one or more control circuits are configured to further modify the modified one or more default tuning constants of the closed-loop controller in response to a change in the particular payload.

8. The UAV of claim 1, wherein:
the one or more control circuits are further configured to:
re-apply the default tuning constants to the closed-loop controller in response to dropping the particular payload from the UAV.

9. The UAV of claim 1, wherein:
the trained machine learning model predicts a weight of the particular payload of the UAV based on the real-time data; and
the one or more control circuits are configured to derive the modified one or more default tuning constants based on the predicted weight.

10. The UAV of claim 1, wherein:
the trained machine learning model directly predicts the modified one or more default tuning constants based on the real-time data.

11. A method, the method comprising:
collecting first real-time data of operation of a motor of a first UAV while flying the first UAV with a plurality of different payloads;
training a machine learning (ML) model based on the first real-time data;
controlling a motor of a second UAV using a closed-loop controller;
producing second real-time data of operation of the motor of the second UAV while the motor of the second UAV is controlled by the closed-loop controller;
inputting the second real-time data from the closed-loop controller into the trained ML model;
making a prediction by the trained ML model based on the second real-time data;
deriving tuning constants based on the prediction by the trained ML model; and
applying the tuning constants to the closed-loop controller while continuing to control the motor of the second UAV using the closed-loop controller.

12. The method of claim 11, further comprising:
inputting an error signal from the closed-loop controller to the trained ML model, wherein the prediction is based on the error signal.

13. The method of claim 11, wherein:
the closed-loop controller comprises a proportional (P) controller;
deriving the tuning constants based on the prediction by the trained ML model based on the second real-time comprises deriving a proportional gain for the P controller; and
applying the tuning constants comprises applying the proportional gain to the P controller.

14. The method of claim 11, wherein:
the closed-loop controller comprises a proportional-integral-derivative (PID) controller;
deriving the tuning constants based on the prediction by the trained ML model based on the second real-time data comprises deriving a proportional gain for the PID controller, deriving an integral gain for the PID controller, and deriving a derivative gain for the PID controller; and
applying the tuning constants comprises applying the proportional gain, the integral gain, and the derivative gain to the PID controller.

15. The method of claim 11, wherein producing the second real-time data of the motor while the motor of the second UAV is controlled by the closed-loop controller comprises:
sensing a current input to the motor of the second UAV while the motor of the second UAV is controlled by the closed-loop controller; and
sensing a voltage of the motor of the second UAV while the motor of the second UAV is controlled by the closed-loop controller.

16. The method of claim 11, wherein producing the second real-time data of the motor of the second UAV while the motor of the second UAV is controlled by the closed-loop controller comprises:
estimating a thrust of the motor of the second UAV while the motor of the second UAV is controlled by the closed-loop controller.

17. A system, comprising:
an Unmanned Aerial Vehicle (UAV); and
a UAV Mechanical Release Device (MRD) attached to the UAV, the MRD configured to secure and release a payload from the MRD;
wherein the UAV comprises:
a propellor;
a motor coupled to the propellor, the motor configured to control the propellor; and
a processor coupled to the motor, the processor configured to:
control the motor using a closed-loop controller;
input real-time data pertaining to the motor into a trained machine learning model, wherein the real-time data includes a real-time thrust estimate, a real-time motor current, and a real-time motor voltage, wherein the trained machine learning model predicts weight characteristics of a particular payload secured to the MRD based on the real-time thrust estimate, the real-time motor current, and the real-time motor voltage;
determine one or more tuning constants based on the predicted weight characteristics of the particular payload; and
apply the one or more tuning constants to the closed-loop controller.

18. The system of claim 17, wherein:
the closed-loop controller comprises a proportional-integral-derivative (PID) controller; and
the one or more tuning constants include a proportional gain, an integral gain, and a derivative gain for the PID controller.

19. The system of claim 17, wherein the trained machine learning model predicts the weight characteristics of the particular payload secured to the MRD further based on a predetermined thrust curve of the motor.

20. The system of claim 19, wherein the real-time data includes an error signal of the closed-loop controller, the trained machine learning model predicts the weight characteristics of the particular payload based further on the error signal of the closed-loop controller.

* * * * *